(12) United States Patent
Clarke et al.

(10) Patent No.: US 6,359,058 B1
(45) Date of Patent: Mar. 19, 2002

(54) DISPERSANTS FOR EMULSION PAINTS

(75) Inventors: John Bernard Clarke; Christopher Robert Walker, both of West Yorkshire (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 09/443,075

(22) Filed: Nov. 18, 1999

Related U.S. Application Data

(63) Continuation of application No. 08/860,806, filed as application No. PCT/GB96/02790 on Nov. 14, 1996.

(30) Foreign Application Priority Data

Nov. 14, 1995 (GB) .............................................. 9523247

(51) Int. Cl.$^7$ .............................. C09D 7/02; C09D 5/02
(52) U.S. Cl. ....................... 524/560; 524/556; 524/599; 525/329.7; 525/366; 525/369; 526/318.4
(58) Field of Search ................. 524/560, 556, 524/599; 526/318.4; 525/329.7, 366, 369

(56) References Cited

U.S. PATENT DOCUMENTS

| | | | |
|---|---|---|---|
| 3,840,487 A | * 10/1974 | Dyson | |
| 3,945,602 A | 3/1976 | Holty et al. | 106/308 |
| 3,980,602 A | 9/1976 | Jakubauskas | 106/308 |
| 4,151,144 A | 4/1979 | Dyson et al. | |
| 4,235,768 A | 11/1980 | Ritter et al. | |
| 4,243,430 A | 1/1981 | Sperry et al. | 106/308 |
| 4,460,732 A | 7/1984 | Buscall et al. | 524/460 |
| 4,502,863 A | 3/1985 | Bornatsch et al. | 8/524 |
| 4,517,098 A | 5/1985 | Hann et al. | 210/701 |

FOREIGN PATENT DOCUMENTS

| | | |
|---|---|---|
| DE | 2161909 | 6/1973 |
| GB | 2005697 | 4/1979 |
| HU | 204 546 | 1/1992 |
| HU | P 940 31 37 | 11/1994 |
| JP | 5582166 | 6/1980 |

* cited by examiner

Primary Examiner—Fred Zitomer
(74) Attorney, Agent, or Firm—David R. Crichton

(57) ABSTRACT

A pigment dispersant, for instance for incorporation in an emulsion paint containing non-reactive or reactive pigment, is a water-soluble copolymer of monomer units derived from two or more monomers of the formula $CH_2{=}CR_1{-}COOR_2$ wherein $R_1$ is methyl in 75 to 85 mol % of the monomer units and is hydrogen in the remainder, and $R_2$ is hydrogen or a cation in 75 to 85 mol % of the monomer units and is $C_{1-8}$ alkyl in the remainder of the monomer units and wherein at least 80% of the $R_2$ alkyl groups are butyl groups.

8 Claims, No Drawings

DISPERSANTS FOR EMULSION PAINTS

This is a continuation of application No. 08/860,806, filed on Sep. 15, 1997, abandoned which is a 371 of PCT/GB96/02790 filed Nov. 14, 1996.

This invention relates to dispersants for forming pigment dispersions which can be incorporated in emulsion paints.

It is common practice to form a stable anionic dispersion of pigment in an aqueous medium containing a polymeric dispersing agent and to blend this with a polymer latex so as to form an emulsion paint. The choice of the dispersant is known to influence significantly various properties of the paint, such as covering power and gloss.

There are described in U.S. Pat. No. 3,840,487 dispersants which are preferably copolymers of 40 to 95 mol % of an unsaturated monocarboxylic acid and 5 to 60 mol % of an unsaturated carboxylic ester. One exemplified dispersant is a copolymer of 44% (molar) acrylic acid with 56% methyl acrylate, and another is a copolymer of 81% acrylic acid with 19% butyl acrylate. We have also commercialised, for this purpose, polyacrylic acid homopolymers (Dispex N40, trademark), and a copolymer of acrylic acid with isobutyl methacrylate (Dispex G40), Dispex being a trade mark.

There have been numerous disclosures of other polymers of acrylic or methacrylic acid with acrylic or methacrylic esters or other hydrophobic monomers as dispersing agents for various materials. For instance in U.S. Pat. No. 3,945,843 a copolymer of 15 to 30 weight percent methyl acrylate and 85 to 70 weight percent acrylic acid is used for dispersing a pigment for coating paper. In U.S. Pat. No. 3,980,602 copolymers of 5 to 25% by weight acrylic acid or methacrylic acid together with various mixtures of alkyl (meth) acrylates and styrene is used for dispersing pigment in an aqueous acrylic paint. In U.S. Pat. No. 4,151,144 a blend of copolymers is used wherein one of the copolymers contains 5 to 20 mole percent ethylenically unsaturated acid and 95 to 80 mole percent ethylenically unsaturated ester units, and the other copolymer contains 5 to 40 mole percent of the acid units and 60 to 95 mole percent of the ester units. In U.S. Pat. No. 4,235,768 a copolymer of, for instance, 20 to 50% by weight methacrylic acid and 50 to 80% by weight butyl acrylate is used for dispersing titanium dioxide pigment. In U.S. Pat. No. 4,460,732 copolymers of 80 to 95% by weight acrylic acid or methacrylic acid or other hydrophilic monomer with a fatty methacrylic or other hydrophobic monomer are used for dispersing pigments. For instance in one example a copolymer of 90% by weight methacrylic acid and 10% by weight lauryl methacrylate is used whilst in the other examples copolymers of acrylic acid with fatty methacrylics and/or styrenes are used. In U.S. Pat. No. 4,517,098 very low molecular weight copolymers of 85 to 97% by weight acrylic acid and 3 to 15% by weight of a hydrophobic monomer are used as dispersants for inorganic particulates and as inhibitors for scale.

Various copolymers are also described in GB 2,005,697. In particular, they are judged in part according to the corrosion resistance of the paint film. Included amongst the numerous copolymers are several examples of copolymers of varying amounts of butyl or methyl methacrylate with methacrylic acid. They are reported as giving variable viscosification and corrosion resistance values.

Although the acidic homopolymers and the copolymers (such as Dispex N40 and Dispex G40) which have been commercially used extensively as pigment dispersants give many satisfactory properties to the final film, a significant problem is that the final film often has inadequate resistance to water. As a result, the paint film is not as resistant to scrubbing with water as would be desirable.

We have now found that copolymers within a particular narrow range can maintain the good dispersant properties (for instance covering power, stability and gloss) of established dispersants but can lead to paint films having greater resistance to scrubbing with water.

According to the invention, a pigment dispersant comprises a copolymer of monomers units derived from two or more monomers of the formula $CH_2=CR_1-COOR_2$ wherein $R_1$ is methyl in 75 to 85 mol % of the monomer units and is hydrogen in the remainder, and $R_2$ is hydrogen or a cation in 75 to 85 mol % of the monomer units and is $C_{1-8}$ alkyl in the remainder of the monomer units and wherein at least 80%, and usually at least 90% of the $R_2$ alkyl groups are butyl.

The invention includes the novel dispersant, stable pigment dispersions formed using it as the sole or main dispersant and suitable for blending into emulsion paints, and emulsion paints formed using the pigment. The invention also includes the use of the defined dispersant as a pigment dispersant in an emulsion paint which is to have improved water resistance, and the use of the emulsion paint for forming coatings having improved water resistance.

The pigment dispersant is formed from one or more carboxylic acid ($R_2$ is hydrogen or cation) monomers and one or more carboxylic ester ($R_2$ is alkyl) monomers in the specified proportions to give good dispersing properties. The total monomers that are used must contain the defined amount of methacrylic groups ($R_1$ is methyl) in order that the dispersant has good dispersion properties and also imparts good water resistance to the eventual film. It is generally preferred for 77 to 82, namely about 80, mol % of the monomer units to be methacrylic ($R_1$ is methyl) and for 77 to 82, namely about 80, mol % of the monomer units to be acid ($R_2$ is hydrogen or cation). Preferably the amounts are 80% and 20%.

At least 50%, and usually at least 70 or 80%, of the acid units are generally methacrylic acid units, with any remaining acid units being acrylic acid units. Usually all the ester units are butyl ester units. They can include or consist of methacrylic ester units (with the acid then including an appropriate amount of acrylic acid to provide the desired amount of methacrylic units). Usually however the ester consists wholly or mainly of acrylate units. Generally the monomers consist only of the defined acid and ester units, although non-interfering small amounts of other monomers can be included if desired.

The preferred dispersant is therefore a copolymer of 75 to 85 mol %, preferably about 80 mol %, methacrylic acid with the balance being butyl acrylate. For instance the copolymer may be formed from 75 to 82 mole %, often 76 to 80 mole %, methacrylic acid and 25 to 18% (often 24 to 20%) butyl acrylate.

The butyl groups present in the dispersant of the invention are usually selected from n-butyl or i-butyl, n-butyl often being preferred. Accordingly, the preferred dispersant is a copolymer of about 80 mol % methacrylic acid and 20 mol % n-butyl acrylate.

The copolymer must have a suitable low molecular weight such that it functions as an effective dispersant and so the molecular weight is generally below about 100,000, preferably below about 70,000. It normally should be at least 2,500 and often at least 10,000. Preferred copolymers have a molecular weight in the range 20,000 to 60,000, preferably about 25,000 to about 50,000.

In the specification, all molecular weights are the Molecular Weight Average (Mw) values obtained by size exclusion chromatography using a set of Toso Haas PWXL columns (G4000+G3000+guard) and sodium polyacrylate standards and sodium acrylate monomer standards.

The copolymer is generally made by solution polymerisation in isopropanol in the presence of an appropriate initiator such as ammonium persulphate, in a manner conventional for the manufacture of low molecular weight polycarboxylic dispersants. The polymerisation conveniently preferably is conducted while the acidic groups are in the form of free acid although the groups can be wholly or partially neutralised to form a water-soluble salt, for instance with alkali metal or amine or ammonia if desired.

Usually the polymer is used in partially or, more usually, substantially fully neutralised form, wherein $R_2$ is alkali metal (usually sodium or potassium), ammonium or amine. The preferred forms are the sodium and ammonium forms.

The dispersing agent may be compounded with inorganic or organic particulate pigment in order to form a pigment paste which can be incorporated into an emulsion paint. The amount of dispersant agent is usually in the range 0.01 to 1% based on the weight of pigment.

The emulsion paint can be an anti-corrosive paint in which event the pigment will be a reactive pigment of the type utilised in anti-corrosive paints. For instance the pigment can be a zinc or aluminium oxide or borate or other salt or can be a calcium phosphate, for instance of the type present in Albritect (trade mark) anti-corrosive pigments, or an aluminium triphosphate pigment of the type present in "K-White" (trade mark) anti-corrosive pigments or a calcium strontium zinc phospho silicate pigment of the type present in Halox (trade mark) anti-corrosive pigments. Preferred anti-corrosive pigments are materials available under the trade names Halox SZP391 and BW100, Albritect D200, K-White 140W, and Hencophos ZPA (trade mark).

An advantage of the invention is that the dispersants give good results both in conventional paints and in anti-corrosive paints including a reactive pigment, and thus a manufacturer can use a single dispersant for all grades.

Additionally, the dispersants of the invention give good results when the pigment is non-reactive, for instance titanium dioxide, china clay and/or calcium carbonate. For instance the dispersants of the invention lead to good gloss values in conventional emulsion paints.

If desired, additional dispersants can be added provided they do not impart water sensitivity. Usually the novel dispersant is the only dispersant.

The paste or slurry can be formed in conventional manner, for instance by ball milling or otherwise blending and grinding the pigment, the dispersing agent and water, in appropriate amounts. The paste usually contains 50 to 90% pigment with the balance generally being water together optionally with minor conventional additives such as antifoam, thickener and/or glycol.

An emulsion paint can be formed in conventional manner by blending the pigment paste with a suitable binder latex. The latex can be, for instance, a vinyl acetate-vinyl ester of versatic acid latex, an ethylene vinyl acetate latex, a vinyl acetate-ethylene-vinyl chloride latex, an acrylic-ethylene-vinyl chloride latex, an acrylic latex or a styrene acrylic latex.

The amount of binder typically ranges from 20 to 80% and pigment 80 to 20% (dry weight). When the binder is a vinyl acetate or ethylene vinyl acetate latex it is often preferred for the paint to be formed from 20 to 40% dry weight binder and 60 to 80% pigment. Such paints may give a rather mat finish. Whereas traditionally such paints are sensitive to alkali and water, the use of the defined dispersant significantly reduces the sensitivity to water.

When higher quality, and usually higher gloss, paint films are required, the amount of binder is typically in the range 50 to 80% preferably 70 to 80%, with the amount of pigment being in the range 20 to 50% preferably 20 to 30% and with the binder generally being an acrylic or styrene acrylic latex. These high binder paints tend to give coatings which are more water resistant and glossy and the use of the novel dispersant tends to increase still further the water resistance of the films formed from such paints.

A particular advantage of the dispersants of the invention is that they not only give improved water resistance but also give effective dispersing properties for a wide range of emulsion paints including matt and satin paints traditionally used on plaster or matt or gloss paints traditionally used on plaster or wood, as well as corrosion resistant gloss or other paints that may be used on metal. Accordingly, the invention provides a dispersant which has such wide ranging effectiveness that it is possible to utilise a single dispersant in substantially all grades of emulsion paint and to obtain thereby not only good water resistance but also satisfactory (for the particular emulsion paint concerned) covering power, stability and other properties.

Thus the invention includes the use by a manufacturer of the same dispersant in accordance with the invention, in anti-corrosive and conventional emulsion paints.

The following are examples of the invention.

EXAMPLE 1

98 parts by weight methacrylic acid and 42 parts by weight n-butyl acrylate (77.6:22.4% molar) are charged into 250 parts isopropyl alcohol containing ammonium persulphate catalyst over a period of 4 hours and aqueous ammonium persulphate is added over a further 4½ hours, and the mixture maintained under reflex for a further 2 hours. The final polymer has molecular weight Mw about 35,000. Caustic soda or aqueous ammonia is then added dissolved in water in an amount to provide a pH of about 7.7. Other copolymers are made in a similar manner as shown in Table 1 below.

EXAMPLE 2

A pigment paste is formed by blending 0.7 g (dry weight) of a dispersant of Example 1 with 800 g of calcium carbonate (eg Snowcal-trade mark-60) and 199.3 g water. The viscosity of each paste is determined (in mPa.s) using a Brookfield RVT at 20 rpm. The values are shown in Table 1 below.

EXAMPLE 3

An emulsion paint is made by blending 376 parts (by weight) water, 7.3 parts of a 20% solution of the dispersant as its sodium salt, 151 parts $TiO_2$, 89 parts china clay, 246 parts Microdol (trade name for a type of dolomite), 88 parts vinyl acetate-ethylene-vinyl chloride latex (Vinamul-trade mark-3480) and minor conventional additives to give a PVC of 80% and a weight solids of 54.3%. A film is formed. Scrub resistance is determined by DIN 53778 Part 1. The results are shown in Table 1.

TABLE 1

| Dispersant | Monomers (molar %) | Viscosity | Scrub |
| --- | --- | --- | --- |
| 1 | 77 MAA 23nBA | 200 | 1325 |
| 2 | 82 AA 18iBMA | 210 | 1250 |
| 3 | 80 MAA 20iBMA | 800 | 1300 |
| 4 | 73 MAA 27MMA | 1500 | 1150 |
| 5 | 75 MAA 25EMA | 2200 | 1175 |
| 6 | 79 MAA 21n-BMA | 2100 | 1300 |
| 7 | 84 MAA 16-2EHA | 1000 | 1350 |
| 8 | 78 AA 22EMA | 1750 | 1100 |
| 9 | 76 AA 24MMA | 1800 | 1100 |

AA = Acrylic Acid  
MAA = Methacrylic Acid  
iBMA = Isobutyl Methacrylate  
nBA = N-Butyl Acrylate  
MMA = Methyl Methacrylate  
EMA = Ethyl Methacrylate  
MnBA = Methyl n-Butylacrylate  
2EHA = 2-Ethyl Hexyl Acrylate These results show that the novel dispersant I gives the best combination of dispersing power (low viscosity) and high scrub resistance. In particular it has dispersing power as good as or better than Dispex G40 (dispersant 2) but gives better water resistance.

EXAMPLE 4

A range of dispersants were tested in anti-corrosive paints. The materials used are set out in Table 2.

TABLE 2

| Dispersant | Monomers (weight %) |
| --- | --- |
| 1 | 77 Methacrylic Acid 23 n Butyl Acrylate |
| 2 | 82 Acrylic Acid 18 iso Butyl Methacrylate |
| 10 | 76 Acrylic Acid 24 maleic anhydride |
| 11 | 86 Acrylic Acid 14 AMPS |
| 12 | 100 Acrylic Acid |
| 13 | "Orotan 731" |
| 14 | "Orotan 850" |

The Orotan (trade mark) products are proprietary materials. It is thought that Orotan 731 is a copolymer of di-isobutylene and maleic anhydride while Orotan 850 is thought to be a homopolymer of methacrylic acid. Orotan 850 is sold particularly for use in anti-corrosive paints.

A 61% solids slurry was prepared of a pigment blend

| | (%) | |
| --- | --- | --- |
| Tiona 535 | 40.02 | Titanium Dioxide |
| Microdol 1 | 27.67 | Calcium Magnesium Carbonate |
| Queensfil 25 | 16.92 | Calcium Carbonate |
| Halox SZP 391 | 15.32 | Calcium Strontium Zinc Phosphosilicate |

Tiona, Microdol, Queensfil and Halox are trade marks. Once the slurry was prepared 0.1 ml increments of dispersant were added and mixed thoroughly into the system. Viscosity was recorded after each dispersant addition using a Brookfield RVT viscometer at 20 rpm/25° C.

All dispersants were diluted to 20.0% active before dispersion assessment. The optimum viscosity and the optimum dosage are shown in Table 3.

TABLE 3

| Dispersant | Optimum Viscosity (cP) | Optimum Dosage % Dry Dispersant/ Dry Pigment |
| --- | --- | --- |
| 1 | 40 | 0.12 |
| 2 | 40 | 0.1 |
| 10 | 160 | 0.14 |
| 11 | 40 | 0.076 |
| 12 | 40 | 0.076 |
| 13 | 40 | 0.08 |
| 14 | 40 | 0.077 |

A 40% PVC anti-corrosive emulsion paint formulation was prepared from the following composition.

| Product | | |
| --- | --- | --- |
| Water | 22.8 | |
| Propylene Glycol | 1.11 | Wet edge improver |
| Tegofoamex 1488 | 0.26 | Defoamer |
| Dispersant | See below | Dispersant |
| Tiona 535 | 13.88 | Pigment |
| Microdol 1 | 9.60 | Filler |
| Queensfil 25 | 5.87 | Extender |
| Halox SZP 391 | 5.34 | Anti-corrosive pigment |
| Acronal S760 | 35.64˙ | Binder |
| Texanol | 0.64 | Coalescing solvent |
| Water | 3.24 | |
| Acticide DW | 0.26 | Biocide/fungicide |
| Rheovis CR | 0.66 | Thickener |
| Rheovis CR2 | 0.70 | Thickener |
| TOTAL | 100.00 g | |

Tegofoamex, Acronal, Texanol, Acticide and Rheovis are trade marks.

pH is adjusted to between 8 and 9 using 10% sodium hydroxide. The composition has a solids content of 53%. The dosage of each dispersant was selected so that, based on active ingredients, it was twice the optimum dosgae for that dispersant (this being consistent with the relevant conventional formulation prctice).

Viscosity was recorded over time with a Brookfield RVT viscometer 20 rpm 25° C.

Stability was assessed visually and with respect to viscosification over time at room temperature and at an elevated temperature of 40° C.

The results are shown in Table 4.

TABLE 4

| | Brookfield RVT 20 rpm/25° C. (P) | | | | | | | ICI Cone & Plate |
| --- | --- | --- | --- | --- | --- | --- | --- | --- |
| Dispersant | Initial | 7 Day | 14 Day | 21 Day | 28 Day | 35 Day | 42 Day | 40° C. 28 Day | 25° C (P) 28 Day |
| 1 | 34 | 58 | 72 | 89 | 108 | 110 | 118 | 125 | 0.6 |
| 2 | 46 | 88 | 104 | 100 | 125 | 133 | 138 | 157 | 0.6 |
| 10 | 64 | 84 | 92 | 115 | 127 | 138 | 140 | 170 | 0.5 |
| 11 | 44 | 76 | 87 | 98 | 119 | 124 | 128 | 140 | 0.55 |
| 12 | 32 | 79 | 95 | 108 | 115 | 128 | 130 | 148 | 0.5 |
| 13 | 64 | 74 | 92 | 106 | 120 | 127 | 135 | 160 | 0.55 |
| 14 | 38 | 67 | 84 | 90 | 90 | 110 | 120 | 130 | 0.55 |

Tests were conducted on dry films formed from the emulsion. To determine water resistance, a clean dry glass plate was coated using a 0.006th inch bird bar applicator and dried for seven days at room temperature, after which the panel was spotted with water. Results were recorded at first signs of reaction with water.

To determine gloss, using the glass panel coated in (a) a BYK Micro Tri Gloss meter was used to assess gloss after 3 days of drying at room temperature.

To determine water absorptiveness by the Cobb test, a paint sample was applied at a coat weight of 7–9 gsm on to the base side of unbleached kraft paper using a K bar 2 applicator and dried for 15 minutes in a 110° C. oven, the water absorptiveness was tested using TAPPI T441 OM-90 (1990) for 5 minutes.

The results are shown in Table 5.

TABLE 5

| Dispersant | Gloss 60° | Water Resistance (mins) | COBB (g/m$^2$) |
| --- | --- | --- | --- |
| 1 | 26.2 | 435 | 144 |
| 2 | 27.7 | 335 | 148.5 |
| 10 | 24.9 | 5 | 210 |
| 11 | 22.9 | 99 | 171 |
| 12 | 31.4 | 43 | 202.5 |
| 13 | 27.2 | 183 | 153 |
| 14 | 26.2 | 282 | 171.6 |

To determine salt spray resistance, a sample of test paint was coated on to the burnished side of a mild steel 'Q Panel' (100 mm by 150 mm) using K bar 8 (100 μm wet). After the first application of sample the panel was dried in a 75° C. oven for 72 hours after which the panel was removed and allowed to cool. A further application of test paint was applied to obtain a dry film thickness of 100 μm. A drying period of 8 days/75° C. to fully cure the panels was completed. To the reverse side of the panel a high quality solvent based metal primer was applied to ensure rusting did not contaminate the main test site.

Results were assessed using Ericksen (trade mark) apparatus using a 55±0.5% salt solution (prepared in deionised water) at pH 7 with compressed air having 85 to 90% relative humidity and a temperature of 35° C. The results are shown in Table 6.

TABLE 6

| Dispersant | Failure Time (Hours) |
| --- | --- |
| 1 | 202 |
| 2 | 192 |
| 10 | 53 |
| 11 | 53 |
| 12 | 53 |
| 13 | 192 |
| 14 | 53 |

The data in tables 3 to 6 clearly demonstrates that the dispersant of the invention, dispersant 1, gives a better combination of corrosion resistance, water resistance and other film properties and stability than the other dispersants which were tested.

What is claimed is:

1. A product selected from
   (a) a pigment dispersant,
   (b) a pigment dispersion including a dispersant, and
   (c) an emulsion paint comprising a binder latex and a pigment dispersion containing a dispersant,
in each of which the dispersant is a water-soluble copolymer formed from 75 to 85 mol % methacrylic acid and 15 to 25 mol % n-butyl acrylate and wherein the dispersant is optionally wholly or partially neutralized as a salt.

2. A product according to claim 1 in which the polymer has molecular weight 20,000 to 60,000.

3. A product according to claim 1 in which the dispersant is wholly or partially neutralised as an alkali metal or ammonium salt.

4. A product according to claim 1 formed from 75 to 82 mole % methacrylic acid and 18 to 25 mol % n-butyl acrylate.

5. A product according to claim 1 which is a pigment dispersion or an emulsion paint including a pigment dispersion, wherein the pigment is a reactive pigment.

6. A product according to claim 1 and which is an emulsion paint comprising a pigment latex and a pigment dispersion containing the dispersant.

7. A product according to claim 6 in which the emulsion paint is an anti-corrosive paint and the pigment comprises reactive pigment.

8. A product according to claim 6 which the pigment of the emulsion is non-reactive.

* * * * *